United States Patent [19]
Vaidyanathan

[11] Patent Number: 6,067,055
[45] Date of Patent: May 23, 2000

[54] POLARIZATION DIVERSITY ANTENNA ARRAY

[75] Inventor: Bala Vaidyanathan, Greenbelt, Md.

[73] Assignee: LCC International Inc., Arlington, Va.

[21] Appl. No.: 08/710,764

[22] Filed: Sep. 20, 1996

[51] Int. Cl.[7] .................................................. H01Q 21/28
[52] U.S. Cl. ......................... 343/844; 343/795; 343/853
[58] Field of Search .................................... 343/853, 844, 343/797, 798, 893, 796, 799, 800, 700 MS, DIG. 2, 795; H01Q 21/24, 21/26, 21/28, 21/29

[56] References Cited

U.S. PATENT DOCUMENTS

| | | | |
|---|---|---|---|
| 3,938,151 | 2/1976 | Trenam | 343/795 |
| 4,605,932 | 8/1986 | Butscher et al. | 343/700 MS |
| 4,899,162 | 2/1990 | Bayetto et al. | 343/700 MS |
| 4,980,692 | 12/1990 | Rudish et al. | 343/700 MS |
| 5,216,430 | 6/1993 | Rahm et al. | 343/700 MS |
| 5,243,354 | 9/1993 | Stern et al. | 343/700 MS |
| 5,349,362 | 9/1994 | Forbes et al. | 343/873 |
| 5,486,836 | 1/1996 | Kuffner et al. | 343/700 MS |
| 5,499,033 | 3/1996 | Smith | 343/700 MS |
| 5,502,453 | 3/1996 | Tsukamoto et al. | 343/756 |
| 5,506,591 | 4/1996 | Dienes | 343/818 |
| 5,519,406 | 5/1996 | Tsukamoto et al. | 343/700 MS |

FOREIGN PATENT DOCUMENTS

| | | | |
|---|---|---|---|
| 2631081 | 1/1978 | Germany | 343/798 |
| 2191044 | 12/1987 | United Kingdom | H01Q 21/24 |

OTHER PUBLICATIONS

Boray et al., Conjugate Gradient Techniques for Adaptive Filtering, IEEE Transactions on Circuits and Systems–I Fundamental Theory and Applications, vol. 39, No. 1, Jan. 1992.

Vaidyanathan et al., Dual Polarized Smart Antenna Beams, IEEE 46th Vehicular Technology Conference, Apr. 28–May 1 1996.

*Primary Examiner*—Michael C. Wimer
*Attorney, Agent, or Firm*—Finnegan, Henderson, Farabow, Garrett & Dunner

[57] ABSTRACT

A cylindrical, omnidirectional antenna array includes a plurality of vertically spaced circular rows and a plurality of angularly spaced vertical columns, with an antenna element located at each row-column intersection. The antenna elements included in one 180° sector of the cylindrical array are vertically polarized, while the antenna elements included in the other, diametrically opposed 180° sector are horizontally polarized to provide polarization diversity. Optionally, the antenna may be adapted as a sector antenna array by reducing the number of columns and the angles of the diametrically opposed sectors to less than 180°.

9 Claims, 2 Drawing Sheets

6,067,055

POLARIZATION DIVERSITY ANTENNA ARRAY

FIELD OF THE INVENTION

The present invention relates to electromagnetic wave antennas and particularly to an antenna array having polarization diversity.

BACKGROUND OF THE INVENTION

Advances in mobile communications have opened up enormous opportunities in cellular communications, terrestrial PCS communications, wireless local loop and satellite PCS communications through medium/low earth orbiting satellites. With the increase in complexity of services and density of the electromagnetic radiation environment, spectrum is becoming increasingly scarce. The effects of fading caused by absorption in the transmission medium, and changes in the propagation characteristics of waves due to multiple reflections, diffraction and scattering from objects in the medium such as buildings, terrain variations and moving vehicles, have been investigated at frequencies below 1 GHz and also at frequencies in the 2.0 GHz band. Current interest has centered on determining propagation characteristics at 28 GHz/40 GHz, which are expected to be of great interest in the future for PCS communication through very low earth orbiting satellites.

Many techniques have been developed to minimize these effects, one of the most effective being diversity reception. The implementation of a diversity reception scheme depends on the arrival of two independently fading signals which have LAW OFFICES comparable signal levels. The cross-correlation between the envelopes of these incoming signals is used as an indication of the independence, and the amount of cross-correlation, known as cross-correlation factor, determines the degree to which the rate and depth of fading may be reduced. The cross-correlation factors should be as low as possible to achieve maximum benefit from diversity reception and consequently achieve diversity gain. In practice, designs are aimed at getting a cross correlation factor not exceeding 0.7.

In diversity reception of the type known as space diversity reception, reception occurs via two spatially separate paths. Recent investigations on the effects of space diversity reception at a base station antenna in the 1800 GHz band have shown that, if the base station antenna is inclined with reference to the mobile antenna, there is an appreciable degradation in the received signal level. This degradation has been found to be of varying extent for different angles of inclination with reference to the mobile antenna.

Unfortunately, transmission from mobile antennas (uplinks) undergo random changes in polarization due to diffraction and scattering by objects, and furthermore the orientation of mobile antenna is also random depending on how the mobile user holds the handset. As a result, the plane of polarization of linearly polarized waves in the uplinks undergo random changes, resulting in fading of the signal received at the base station antenna.

Another problem caused by reliance on space diversity is that quite often the mounting of two antennas on buildings and towers with the required horizontal and vertical spacing for space diversity pose engineering and zoning concerns—particularly in systems which employ small cells and antennas at heights lower than the surroundings.

If the base station antenna is invested with the capability to discriminate the incoming waves in orthogonally polarized planes, and if this discrimination can be quantitatively measured in dB as cross polarization discrimination factor, experimental work has indicated that this figure may be in the order of 6 to 20 dB.

This leads to the possibility of taking advantage of "polarization diversity" at base station antennas.

SUMMARY OF THE INVENTION

It is accordingly an objective of the present invention to provide an improved antenna array that avoids the disadvantages and drawbacks of current space diversity antennas.

A further objective of the present invention is to provide an improved antenna array that relies on polarization diversity to improve the reception of electromagnetic waves transmitted over fading RF channels.

Another objective of the present invention is to provide a polarization diversity antenna array that is compact in size and economical to manufacture.

Additional objectives and advantages of the present invention will be set forth in the following description, and in part will be apparent from the description, or may be learned by practice of the invention. The objectives and other advantages of the invention will be realized and attained by the apparatus particularly pointed out in the written description and claims hereof, as well as the appended drawings.

To achieve these and other advantages and in accordance with the purpose of the invention, as embodied and broadly described, the present invention is directed to a polarization diversity antenna array comprising a first antenna sector including a plurality of first antenna elements of a first polarization arranged in vertically and angularly spaced relations; and a second antenna sector, situated in opposed relation to the first antenna sector, including a plurality of second antenna elements of a second polarization orthogonal to the first polarization and arranged in vertically and angularly spaced relations.

BRIEF DESCRIPTION OF THE DRAWINGS

For a full understanding of the nature and advantages of the present invention, reference may be had to the following detailed description, taken in conjunction with the appended drawings, in which.

Corresponding reference numerals refer to like parts throughout the several views of the drawings.

DETAILED DESCRIPTION OF THE PREFERRED EMBODIMENT

Figure 1:
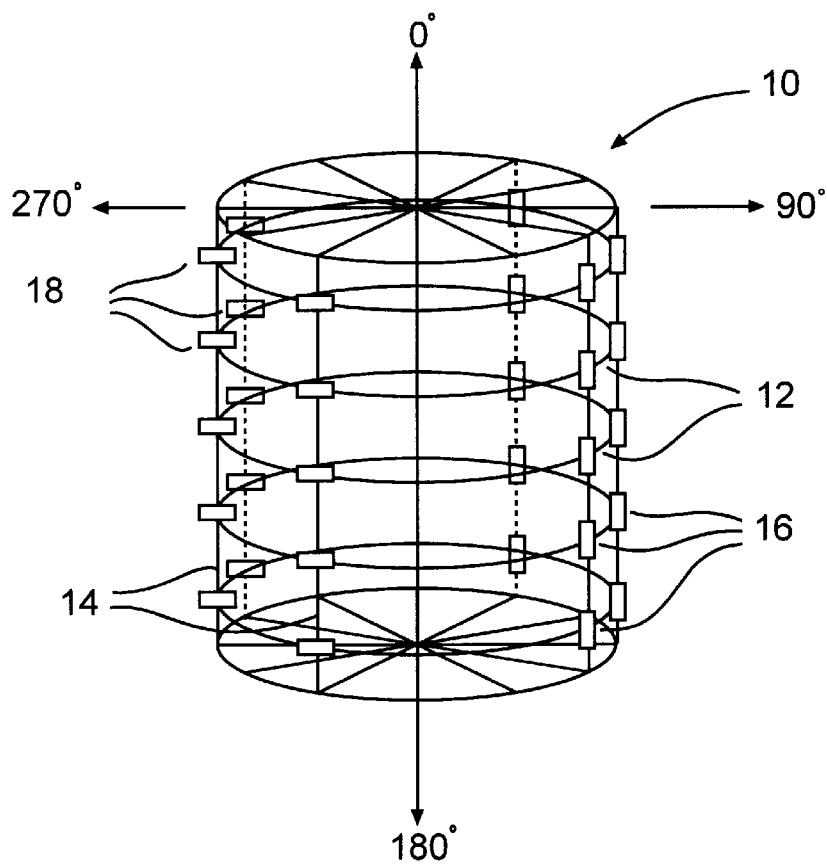
FIG. 1 is a perspective view of a polarization diversity antenna array in accordance with a preferred embodiment of the invention.

The polarization diversity antenna array 10 of the present invention, in its presently preferred embodiment illustrated in FIG. 1, includes a cylindrical arrangement of antenna elements arrayed in a plurality of vertically spaced circular rows 12 and angularly spaced columns 14. Array 10 includes five uniformly vertically spaced rows 12 and twelve uniformly angularly spaced columns 14 of antenna elements. An antenna element is located at each row/column intersection, and thus the total number of antenna elements in the illustrated embodiment 10 is sixty. For drawing simplicity, not all antenna elements are shown in FIG. 1. However, it will be understood by those skilled in the art that the numbers of rows and columns, as well as the numbers of antenna elements in the rows and columns, may be other than those indicated.

Figure 2:
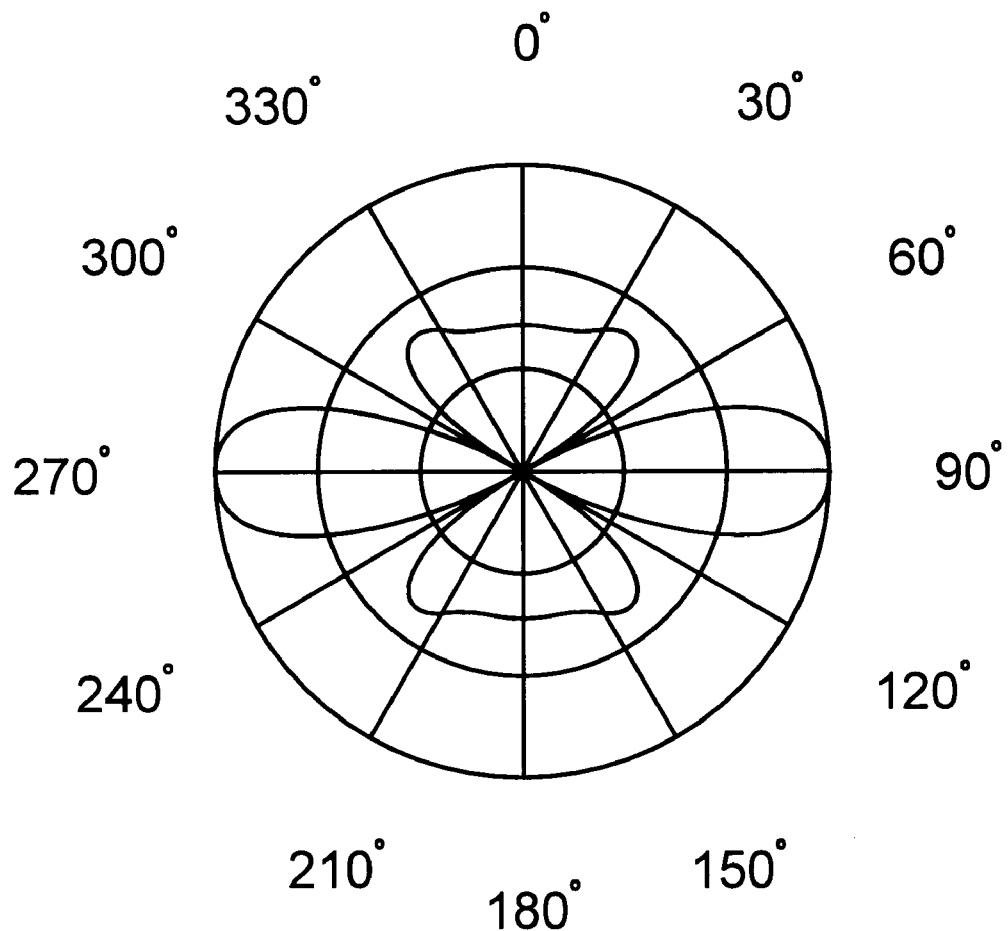
FIG. 2 illustrates a typical beam pattern of coverage for a single column of antenna elements in the antenna array of FIG. 1.

To achieve polarization diversity in accordance with the present invention, one-half of the antenna elements, indicated at 16, of their cylindrical arrangement located in a 180° sector, e.g., from a 0° vector to a 180° vector, are vertically polarized, while the other half of the antenna elements, indicated at 18, are horizontally polarized. The interior of the cylindrical antenna element arrangement is transparent to electromagnetic waves, and thus antenna array 10 is omnidirectional, in that a horizontally or vertically polarized signal incoming from any direction will be optimally received by antenna elements 16, 18 in one or the other of diametrically opposed columns 14 of antenna elements which are most closely aligned with the signal direction. It is thus seen that the 180° sector including the six columns of antenna elements 16 provide omnidirectional, 360° reception coverage in azimuth for vertically polarized signals, while the 180° sector including the six columns of antenna elements 18 provide omnidirectional, 360° reception coverage in azimuth for horizontally polarized signals. Each column of antenna elements may provide coverage of 30° in azimuth and 30° in elevation. FIG. 2 illustrates a typical beam pattern of coverage for a single column 14 of antenna elements with identical coverage in the forward and backward directions.

If, due to the random effects noted above, polarization of an incoming signal is at an angle between horizontal and vertical polarization, the antenna elements of the two diametrically opposed columns 14 aligned with the signal direction will effectively couple with vertical and horizontal vector components, respectively, of the incoming signal magnitude. Thus, it will be appreciated that feedlines (not shown) additively connect the antenna elements of each column 14 with each other, and also with the orthogonal polarized antenna elements of a diametrically opposed column 14 to a signal combining network (not shown).

The vertical separation between antenna elements 16, 18 of each column 14, i.e., row separation, may typically be in the range of one-quarter to one-half of the signal wavelength. This row separation may be varied, and the number of rows may also be varied to achieve elevation coverages in angles other than 30°. The uppermost and lowermost antenna elements 16, 18 of each column 14 may be spaced one-quarter of the signal wavelength from the top and bottom of array 10. Exemplary overall dimensions of the antenna array may be 102 cm in height and 70 cm in diameter for application in the 860 MHz band. For application in the PCS band, the antenna array height and diameter may be 47 cm and 32 cm in height, respectively.

Figure 3:
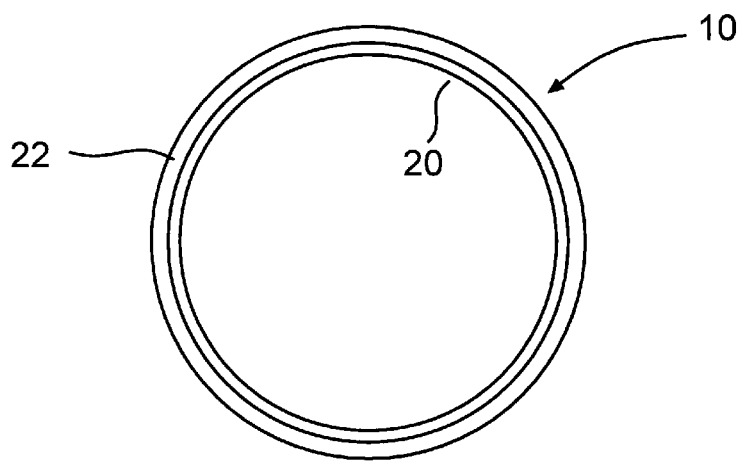
FIG. 3 is a plan view of the antenna array of FIG. 1.

The rows 12 and columns 14 of antenna elements 16, 18, together with their associated feedlines may be constituted as a printed circuit pattern formed on a thin sheet or film of plastic material, such as a polyester. The antenna elements would then consist of linear conductor runs oriented vertically to provide antenna elements 16 and horizontally to provide antenna elements 18. The lengths of these linear conductor runs may typically be 3 cm for the 860 MHz band and 1.4 cm for the PCS band at 180° MHz. The thin plastic sheet bearing the printed circuit of antenna array 10, indicated at 20 in FIG. 3, may then be coiled into a cylinder form and placed within a cylindrical shell 22 of a suitable protective material commonly used for radomes. The antenna array can then be supported in its cylindrical arrangement by the contact of sheet 20 with the inner surface of shell 22. Circular plates (not shown) of the same material may be affixed to cover the upper and lower ends of shell 22 to fully protect the antenna assembly from weather.

It is seen from the foregoing description that the present invention provides a polarization diversity antenna array of economical and compact construction and improved signal reception characteristics. While antenna 10 is illustrated as being omnidirectional, it will be appreciated that the principles of the invention may be readily adapted to a sector antenna. For this purpose, back radiation is suppressed, so that sector coverage only in the forward direction is provided. Furthermore, sector coverages from 180° down to 150°, 120°, 90°, 60° or 30° are achievable by using only the required number of columns 14, i.e., not all sectors of the six columns 14 required for omnidirectional coverage.

Moreover, it will be understood that, while the foregoing description is in the context of array 10 being applied as a receiving antenna array, a transmitting antenna array would have essentially the same construction. Moreover, the antenna array may be adapted to serve as both a transmitting and receiving antenna array.

It will be apparent to those skilled in the art that various modifications and variations can be made in the antenna array of the present invention without departing from the spirit or scope of the invention. Thus, it is intended that the present invention cover modifications and variations of this invention, provided they come within the scope of the appended claims and their equivalents.

What is claimed is:

1. A communications antenna array comprising:

a first antenna sector including a plurality of first antenna elements of a first polarization arranged in vertically and angularly spaced relations; and a second antenna sector, situated in horizontally spaced opposed relation to the first antenna sector, including a plurality of second antenna elements of a second polarization orthogonal to the first polarization and arranged in vertically and angularly spaced relation, said first and second antenna elements arranged circumferentially about a center vertical axis such that no more than one of each type element is on any horizontal line passing said center vertical axis.

2. The antenna array defined in claim 1, wherein each of the first and second antenna sectors has an included angle of at least 30° in azimuth.

3. An omnidirectional communications antenna array comprising:

a plurality of first antenna elements of a first polarization; and a plurality of second antenna elements of a second polarization orthogonal to the first polarization;

the first and second antenna elements arranged in vertically spaced circular rows and angularly spaced vertical columns, the first antenna elements located at each row-column intersection in one 180° sector of the communications antenna array, and the second antenna elements located at each row-column intersection in another 180° sector of the communications antenna array with each column of one sector diametrically opposed to a corresponding column of the opposing polarization of the other sector.

4. The antenna array defined in claim 3, wherein the circular rows are five in number.

5. The antenna array defined in claim 3, wherein the vertical columns are twelve in number.

6. The antenna array defined in claim 3, wherein the vertical columns are angularly spaced at least 30° apart.

7. The antenna array defined in claim 3, wherein the vertical spacing between adjacent circular rows is in a range of one-quarter to one-half of a reception/transmission signal wavelength.

8. The antenna array defined in claim 3, further comprising a plastic sheet on which the first and second antenna elements are provided in printed circuit form.

9. The antenna array defined in claim 3, further comprising a cylindrical outer shell within which a plastic sheet is situated in supported cylindrical form against an inner surface of the shell.

* * * * *